(12) United States Patent
Melnik

(10) Patent No.: US 6,842,430 B1
(45) Date of Patent: Jan. 11, 2005

(54) METHOD FOR CONFIGURING AND ROUTING DATA WITHIN A WIRELESS MULTIHOP NETWORK AND A WIRELESS NETWORK FOR IMPLEMENTING THE SAME

(75) Inventor: George A. Melnik, Montrose, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 08/735,276

(22) Filed: Oct. 16, 1996

(51) Int. Cl.[7] .............................................. H04L 12/28
(52) U.S. Cl. ....................... 370/254; 370/400; 370/408; 340/825.02
(58) Field of Search ................................ 370/351, 392, 370/254, 255, 256, 408, 409, 338, 328, 400, 310; 455/67.1; 340/825.5, 825.51, 825.44, 825.02

(56) References Cited

U.S. PATENT DOCUMENTS

| 5,142,694 A |   | 8/1992 | Jackson et al. ............ 455/67.1 |
| 5,504,746 A | * | 4/1996 | Meier ......................... 370/338 |
| 5,673,031 A | * | 9/1997 | Meier ..................... 340/825.08 |
| 5,737,318 A |   | 4/1998 | Melnik ........................ 370/254 |

OTHER PUBLICATIONS

U.S. application Ser. No. 08/558,447, Aninda Dasgupta, filed Nov. 16, 1995.
U.S. Appl. No. 08/608,910, filed Feb. 29, 1996, George Melnik, pp. 1–40.

* cited by examiner

Primary Examiner—Ajit Patel

(57) ABSTRACT

A method for configuring a wireless network comprised of a control node and a multiplicity of individual nodes includes the steps of logically organizing the network into a plurality of bands Bi, wherein each of the bands Bi includes a plurality of the individual nodes and is located a number i of hops away from the control node, where i=0 through N, and N≧1, and then assigning a logical address to each of the individual nodes, and storing the assigned logical addresses in the respective individual nodes. The assigned logical address for each individual node includes a first address portion which indicates the band Bi in which that individual node is located, and a second address portion that identifies that node relative to all other individual nodes located in the same band. The network is preferably a packet-hopping wireless network in which data is communicated by transferring data packets from node-to-node over a common RF channel. Each of the individual nodes is preferably programmed to perform the step of comparing its own logical address to a routing logical address contained in each packet which it receives, and to either discard, re-transmit, or process the packet based upon the results of the comparison. The routing logical address contained in a received packet contains the full routing information required to route the packet from a sending node to a destination node along a communication path prescribed by the routing logical address. The control node is programmed to control the routing of packets by inserting the routing logical address into each packet which it transmit, detecting any unsuccessfully transmitted packets, detecting a faulty node in the communication path prescribed by the routing logical address in response to detecting an unsuccessfully transmitted packet, and changing the routing logical address of the unsuccessfully transmitted packet to a new routing logical address which prescribes a new communication path which does not include the detected faulty node. Also disclosed are a wireless network and a network node which are designed to implement the foregoing network configuration and/or routing methods.

27 Claims, 2 Drawing Sheets

| FLAG | ID | ADD.LNG. | LOG. ADD. | CMD | CMD_DATA | CHKSUM |
|------|-----|----------|-----------|------|----------|--------|
| $D0  | $XX | $02      | $47B0     | $0A  | $10      | $3D    |

| FLAG | ID | HOP INFO. | LOG. ADD. | CMD | CMD_DATA | CHKSUM |
|------|-----|-----------|-----------|------|----------|--------|
| $D0 | $XX | $33 | $4325 | $0A | $10 | $3D |

METHOD FOR CONFIGURING AND ROUTING DATA WITHIN A WIRELESS MULTIHOP NETWORK AND A WIRELESS NETWORK FOR IMPLEMENTING THE SAME

BACKGROUND OF THE INVENTION

The present invention relates generally to wireless, multihop networks (sometimes also referred to as "wireless local area networks (W-LANs)" or "wireless, packet-hopping networks"), and more particularly, to a method for configuring and routing data packets within a wireless, multihop network and a wireless network for implementing the same. In particular, the present invention constitutes a significant improvement over the PaST ("PArtitioned Spanning Tree") routing algorithm and wireless network disclosed in co-pending U.S. patent application Ser. No. 08/558,447, filed Nov. 16, 1995, in the name of A. Dasgupta, which is assigned to the assignee of the present invention, the disclosure of which is herein incorporated by reference.

A network which consists of a plurality of network or individual nodes which communicate with each other and with a network control node (also referred to as a "main" or "central" node) via wireless (radio or RF) links is generally referred to as a wireless (radio or RF) network. In wireless, multihop networks, each node includes a node controller which includes a digital signal processing device (e.g., a microprocessor) and an RF transceiver. Data is communicated (transferred) between the individual nodes and the control node by a technique known as "hopping", in which individual units of data are transferred from the control node to a destination node and from an origin (source/sender) node to the control node by being hopped (relayed or retransmitted/rebroadcast) by one or more intermediate nodes in accordance with a network routing protocol, in all instances in which the destination or origin node does not have a direct communication link with the control node. Each of the nodes which hops or relays a packet to one or more other nodes in the network is commonly referred to as a "repeater node", or simply, "repeater". The destination node generally acknowledges receipt of a data packet from the control node by returning an acknowledgement data packet to the control node via one or more repeaters in a similar fashion.

Various logical units of data can be utilized, including packets, frames, or cells. However, for convenience of illustration of a presently preferred embodiment of the present invention, the units of data employed will be "packets" typically ranging in size from about 5–1000 bytes. In this regard, the term "packets" as used herein is intended to encompass all logical units of data, including frames or cells. Generally, packet-hopping data communications are carried out under the control of the control node, which is typically a computer on which resides the data communications control software. The packet-hopping data transfer scheme enables a reduction in the cost of the RF transceivers and compliance with FCC Part 15 requirements.

Such wireless, packet-hopping networks are particularly suitable for controlling one or more functions or systems of a building, e.g., the lighting, HVAC, and/or security systems of the building, because a wireless network offers a low-cost, indoor communication infrastructure that does not require new lines to be added to the existing structure in order to carry the network information. Further, such networks can support additional systems installed in the building, such as paging and personal communications systems (PCSs).

The control node of such building control networks is typically a building computer. The individual nodes and the building computer run different software programs which are complementary, and which together constitute the system control software. The individual nodes are typically distributed throughout the building to monitor the status/value of prescribed parameters of the building system being controlled, and to produce control signals in response to commands issued by the building computer to adjust the prescribed parameters as required. It is important that the building computer be able to send and receive data to and from each node in the network in order to properly monitor the status/value of the prescribed parameters, and to issue commands to adjust the status/value of the prescribed parameters as required, in accordance with the system control software.

An exemplary building control network is an automatic or intelligent lighting control system which monitors lighting levels, occupancy status, energy consumption as a function of time, and/or other lighting parameters of each room and/or area of the building within the network, i.e., each room and/or area of the building which is equipped with a lighting module(s) linked to a node controller (also referred to as a "wall unit") which includes an RF transceiver, a digital signal processing device (e.g., microcontroller or microprocessor), and control circuitry to signal the lights to change brightness levels. Each lighting module and its associated node controller together constitute a node in the network which is under the control/management of the building computer.

In such an intelligent lighting control system, each of the lighting modules is preferably individually programmable (e.g., by building occupants), via its associated wall unit, to provide direct control of the setting of the dimming ballast thereof, and thus, direct control of the lighting level of the lamp(s) thereof. In this regard, each of the nodes includes one or more sensors (e.g., occupancy status, daylight (ambient lighting), and dimming/lighting level sensors) which provide sensor feedback data to the digital signal processing device (e.g., a microprocessor) of the node controller, which is programmed to analyze (process) the sensor feedback data and to generate control signals for adjusting the lighting level of the monitored lamp(s) associated therewith, as required, to achieve the programmed local lighting conditions.

The sensor feedback data is also transmitted by each node in the network to the building computer, when requested by the building computer to do so, or when the local lighting conditions change. The building computer analyzes (processes) the sensor feedback data in accordance with lighting system control software loaded therein, and sends control data (commands) to the individual nodes, as required, in order to adjust the lighting levels of the monitored rooms/areas of the building in accordance with the lighting system control software, e.g., to optimize the energy efficiency of the lighting system, and thereby override the programmed lighting levels provided by the individual lighting modules. Thus, in addition to being individually programmable and being capable of independent operation, the distributed modules are functionally integrated into a single building-wide network under the control of the building computer.

Data communications in such networks are generally between the building computer and the individual nodes, and vice versa, over a common communications channel (i.e., a shared channel). In order to minimize simultaneous transmissions of packets over the common network channel, a channel access protocol is utilized. The most common channel access protocol is the carrier sense multiple access (CSMA) protocol, according to which each node, prior to transmitting a packet, waits for a random delay period, and then senses the channel to determine whether it is available ("clear") or unavailable ("busy"). If the channel is sensed to be clear it transmits the packet, and if the channel is sensed to be busy, it waits for another random delay period before sensing the status of the channel again before making a further attempt to transmit the packet.

There are generally two main categories of network routing algorithms or protocols that are typically utilized in wireless, multihop networks, namely, random and deterministic routing protocols.

In accordance with random routing protocols, packets are randomly hopped through the nodes in the network from a sender node to a destination node along random routes, with no specific set of repeaters being used to effectuate the data transfer. More particularly, the sender node transmits a packet to all nodes within its transmitting range and each node which receives the packet then re-transmits or relays the packet to every node within its respective transmitting range, and so on, until the packet reaches the destination node. Typically, each packet contains a byte commonly called the "hop counter", which is decremented by each repeater until it reaches zero. Once it reaches zero, the packet is no longer repeated. The hop counter is set by the sending (transmitting) node such that the probability that the packet reaches the destination node is maximized, without dominating the network for an unduly lengthy period of time.

A significant drawback of random routing protocols is that there is a rather high probability that most, if not all, nodes in the network will handle each and every packet transmitted, thereby greatly increasing the data traffic density in the network, and thus, greatly limiting the number of different packets which can be "on the network" at any given time (i.e., the data traffic handling capacity of the network). This limits the communication efficiency of the network, as well as increasing the number of unresolvable collisions which occur. These unresolvable collisions of data packets can cause packets to be lost before they reach their destination. In this connection, in building control networks, the acknowledgement packets returned to the building computer typically converge on just a few nodes that are directly linked to the building computer, thereby resulting in a higher probability and greater number of unresolvable collisions involving such packets. Consequently, blockage of acknowledgement packets is common, thereby forcing the building computer to re-transmit a packet in order to determine whether the original packet sent was actually received by the destination node. This, of course, significantly limits the data throughput and efficiency of the network.

In accordance with conventional deterministic routing protocols, the building computer formulates routing tables on the basis of nodal connectivity information which it gathers during execution of a network initialization routine. These routing tables are then used to route packets of data from a sender node to a destination node via a specific set or "chain" of repeaters (i.e., along a predetermined route or singular path defined in the routing tables). Due to the fact that these conventional deterministic routing protocols rely upon the use of routing tables in routing data within the network, they are sometimes referred to as "tabular" routing protocols. Because each packet which is transmitted is only re-transmitted (assuming there is no direct link with the building computer) by the one or more nodes along the predetermined communication path (i.e., the specific "chain" of repeater nodes specified in the routing tables) many different packets can be transmitted (i.e., "on the network") simultaneously, thereby resulting in relatively higher network data traffic handling capacity (i.e., data throughput) than is possible using a random routing protocol.

A significant drawback of conventional tabular routing algorithms is the requirement that each node have sufficient memory to store the routing tables, and sufficient processing power to handle the logical operations which are required in order to make the routing decisions based upon the data contained in the routing tables. In this regard, many applications require inexpensive, "resource-starved" nodes, i.e., nodes which have minimal memory and processing power.

To this end, a non-tabular, deterministic routing algorithm which is particularly suitable for wireless, multihop networks having resource-starved nodes is disclosed in co-pending U.S. patent application Ser. No. 08/558,447, filed Nov. 16, 1995, in the name of A. Dasgupta, which is assigned to the assignee of the present invention. This routing algorithm, termed the "PaST" algorithm, enables the utilization of network nodes which employ a low-cost microcontroller and a small amount of memory (e.g., less than 10 bytes), and which can be made compact enough to be incorporated into the device, e.g., light switch or wall unit, being controlled More particularly, a logical Partitioned Spanning Tree (PaST) is constructed by the building computer on the basis of nodal connectivity information gathered during a network initialization procedure, and a unique logical PaST address is assigned to each of the individual network nodes in the network. The logical PaST address assigned by the building computer to each individual node uniquely defines a single set or chain of repeaters that are to be used in communicating packets back and forth between the building computer and the node, and thus, the single, predetermined communication path (route) that a packet must travel to be communicated between the building computer and the individual node. In accordance with the PaST routing protocol, each packet includes a logical address data field into which the logical PaST address of the destination node to which the packet is being transmitted, is inserted.

Since the logical PaST address inserted into the logical address data field of each packet contains all of the information necessary for routing the packet, each of the individual nodes only requires sufficient memory to store their assigned PaST address (typically less than 10 bytes), and sufficient processing power to bit-wise compare their assigned PaST address with that of the PaST address contained in the logical address data field of each packet which the node receives, in order to determine whether it should process, re-transmitt, or discard the packet.

However, because of intrinsic RF constraints of wireless networks, the PaST routing protocol disclosed in co-pending U.S. patent application Ser. No. 08/558,447, filed Nov. 16, 1995, in the name of A. Dasgupta still suffers from a significant drawback. Namely, with this protocol, there is a relatively low probability of a given packet being able to reach its destination, due to its being routed along a single, predetermined communication path (i.e., a single, specific chain of repeaters).

More particularly, the reliability of node-to-node communications in indoor, wireless networks is adversely affected by phenomena such as fading and multipath (the interference of an RF signal with itself due to reflections off surfaces such as walls, floors, ceilings, furniture, etc.), whereby previously established node-to-node links can be interrupted or lost. Further, such previously established node-to-node links can be interrupted or lost by virtue of dynamic changes in the indoor environment of the building, such as certain activities of the building occupants. For example, the simple action of opening or closing or door, moving furniture, or even walking down a hallway can disrupt a node-to-node communication link. Thus, the status of any given node-to-node link within the network may vary over time from solid, to sporadic, to non-existent, depending upon a number of largely unpredictable and uncontrollable variables.

Because of these inherent link reliability problems, data packets transmitted along a singular communication path can be easily lost before they reach their destination, thus requiring such data packets to be re-transmitted, thereby degrading the communications efficiency and data throughput of the network. All that is required for a transmission to be unsuccessful is for a single link in the chain of repeaters to be broken either on the outbound ("downstream") transmission of a command data packet from the building computer to the destination node, or on the inbound ("upstream") transmission of the acknowledgement data packet from the destination node to the building computer.

If the link quality of the problemmatic link(s) is not resolved satisfactorily, then the packet may have to be re-routed, and/or the network reconfigured, thereby further degrading the performance of the network, and increasing its cost and complexity. In this connection, the PaST routing algorithm suffers from the shortcoming that reconfiguration of the network is difficult and time-consuming.

More particularly, although the PaST routing algorithm has a built-in capability of detecting faulty communication links, when such a faulty link is detected, the only measure which can be taken to complete a transmission which is prevented due to the faulty link (i.e., to re-route a data packet around the identified faulty link), is to reprogram the logical PaST address of each node in the logical Partitioned Spanning Tree which lies beyond the faulty node which requires a change in its connectivity in order to eliminate the faulty link. Otherwise stated, every node whose logical PaST address contains an address segment corresponding to the address of the faulty node would have to be re-programmed with a new logical PaST address. This stems from the fact that the single, predetermined communication path ("route") between the building computer and a given individual network node is completely and singularly determined by the PaST address of the given individual network node.

More particularly, since the PaST address of the given individual network node includes the most significant bits of each of its "parent" nodes in the chain of repeaters forming the single, predetermined communication path, it becomes necessary to reprogram the PaST address of each node in the logical Partitioned Spanning Tree which lies beyond the node which requires a change in its connectivity in order to eliminate the faulty link. In many instances, the required change in connectivity to eliminate the identified faulty link will require a re-initialization of the entire network. In sum, simple, dynamic reconfiguration of the network or re-routing of data packets to avoid faulty links is not possible, thereby degrading the efficacy of the PaST routing algorithm, and the data throughput of the network which utilizes this routing algorithm.

There are various known ways to address the above-described link reliability problems. One way to improve link reliability is to use higher-powered RF transceivers, and another way to improve link reliability is to use noise-limiting spread spectrum transceivers. However, both of these approaches are generally cost-prohibitive for many applications. Of course, a hard-wired network would be an ideal solution, but the cost of installing such a network in an existing structure is cost-prohibitive for most applications.

A particularly effective and novel partially random, partially deterministic routing algorithm is disclosed in co-pending U.S. patent application Ser. No. 08/608,910, filed Feb. 29, 1996, in the name of the present inventor (George A. Melnik), and assigned to the assignee of the present invention, the disclosure of which is herein incorporated by reference. This novel routing algorithm greatly increases the data throughput and communications efficiency of the network, as well as enabling a significant reduction in the hardware requirements of the networks (e.g., the required baud rate and size of the packet buffers (memory) for each network node). Nevertheless, this algorithm may not be suitable for some applications which require particularly low-cost, resource-starved nodes.

Based on the above and foregoing, it can be appreciated that there presently exists a need in the art for a method for routing data in a wireless, multihop network which overcomes the above-described drawbacks, shortcomings, and disadvantages of the presently available technology. The present invention fulfills this need in the art. In particular, the present invention encompasses a reconfigurable PaST routing algorithm (R-PaST) which incorporates simple, dynamic reconfigurability, which constitutes a significant improvement over the PaST routing algorithm disclosed in co-pending U.S. patent application Ser. No. 08/558,447, filed Nov. 16, 1995, in the name of A. Dasgupta.

SUMMARY OF THE INVENTION

The present invention encompasses, in one of its aspects, a method for configuring a wireless network comprised of a control node and a multiplicity of individual nodes, which includes the steps of logically organizing the network into a plurality of bands Bi (i denotes a subscript), wherein each of the bands Bi includes a plurality of the individual nodes and is located a number i of hops away from the control node, where i=0 through N, and N≧1, and then assigning a logical address to each of the individual nodes, and storing the assigned logical addresses in the respective individual nodes. The assigned logical address for each individual node includes a first address portion which indicates the band Bi in which that individual node is located, and a second address portion that identifies that node relative to all other individual nodes located in the same band.

The step of logically organizing the network is preferably performed by the control node on the basis of the nodal connectivity information obtained during a network initialization procedure. The network is preferably a packet-hopping wireless network in which data is communicated by transferring data packets from node-to-node over a common RF channel.

Each of the individual nodes is preferably programmed to compare its own logical address to a routing logical address contained in each packet which it receives, and to either discard, re-transmit, or process the packet based upon the results of the comparison. The routing logical address contained in a received packet contains the full routing information required to route the packet from a sending node to a destination node along a communication path prescribed by the routing logical address. In this regard, each received packet preferably includes a direction bit which indicates the direction which the received packet must travel to reach the destination node, a first set of bits (e.g., a byte) which includes a hops value which indicates a number N of hops required to transfer the received packet from the sending node to the destination node, and a number of hops count, a second set of bits (e.g., a byte) which includes the routing logical address, and a third set of bits (e.g., a byte) which includes processing instructions for the destination node.

Further, each of the individual nodes is preferably programmed to increment the number of hops count if the received data packet is to be re-transmitted by that node and if the direction is a first direction (e.g., a downstream direction), and to decrement the number of hops count if the received data packet is to be re-transmitted by the node and if the direction is a second direction (e.g., an upstream direction).

In accordance with another aspect of the present invention, the control node is programmed to control the routing of packets by inserting the routing logical address into each packet which it transmits, detecting any unsuccessfully transmitted packets, detecting a faulty node in the communication path prescribed by the routing logical address in response to detecting an unsuccessfully transmitted packet, and changing the routing logical address of the unsuccessfully transmitted packet to a new routing logical address which prescribes a new communication path which does not include the detected faulty node.

In a presently preferred embodiment of the present invention, the wireless network is a building system control network (e.g., an intelligent lighting control system), and the control node is a building computer.

In another of its aspects, the present invention encompasses a wireless network and a network node which are designed to implement the network configuration and/or routing methods described above.

BRIEF DESCRIPTION OF THE DRAWINGS

These and various other features and advantages of the present invention will be readily understood with reference to the following detailed description of the invention taken in conjunction with the accompanying drawings, in which.

DETAILED DESCRIPTION OF THE INVENTION

Figures 1, 2:
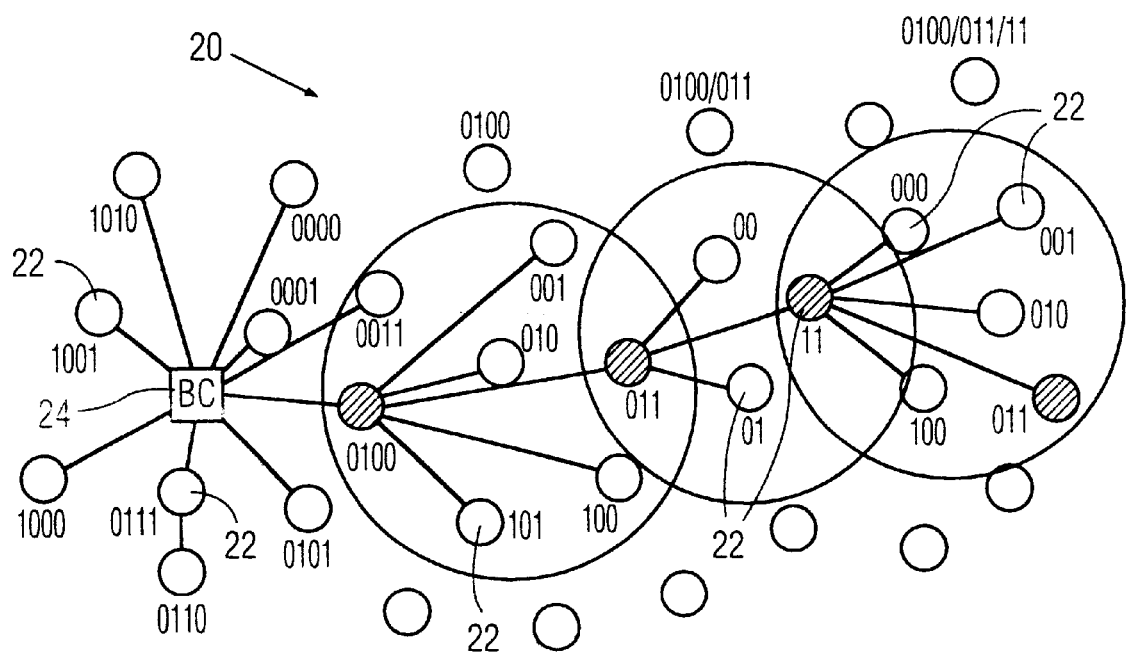
FIG. 1 depicts the logical data structure of a typical data packet which is used in a wireless, multihop network which employs the PaST routing algorithm disclosed in co-pending U.S. patent application Ser. No. 08/558,447, filed Nov. 16, 1995, in the name of A. Dasgupta.
FIG. 2 is a diagrammatical representation of a selected portion of a wireless, multihop network which employs the PaST routing algorithm, which depicts the logical address structure of a single branch of the Partitioned Spanning Tree (PaST) which is used in deriving the logical PaST addresses of the individual nodes in the network, and which also depicts an exemplary data communication path through a chain of repeater nodes specified by the logical PaST address assigned to the destination node.

With reference now to FIG. 1, there can be seen the logical data structure of a typical data packet which is used in a wireless, multihop network which employs the PaST routing algorithm disclosed in co-pending U.S. patent application Ser. No. 08/558,447, filed Nov. 16, 1995, in the name of A. Dasgupta. A detailed description of the logical data structure of the data packet is disclosed in the above-referenced application, which has been herein incorporated by reference.

To summarize, the exemplary data packet which is used in the PaST routing algorithm includes:

a) a "FLAG" byte which contains several bit fields, including a bit field which indicates the priority level of the packet, a bit field which indicates the packet type (e.g., broadcast, multicast, or unicast), a bit field which indicates the routing protocol (e.g., PaST, FHC, or PARENT) to be utilized for routing the packet, and a bit field which indicates the direction of travel of the packet, i.e., either "upstream" or "downstream");

b) an ID byte which contains the unique address assigned to the packet; an "Address Length" (Add. Lng.) byte which specifies the bit length of the address byte which is inserted by the building computer into the adjacent "Logical Address" (Log. Add.) field;

c) in the "downstream" direction, the Logical Address byte contains the logical PaST address of the destination node (i.e., the individual network node to which the building computer is sending the packet), and in the "upstream" direction, the logical PaST address byte contained in the Logical Address field will be the address of the sending node. Of course, the logical PaST address byte contained in the Logical Address field remains the same if the destination of the "downstream" packet (e.g., a command packet) and the transmitter of the "upstream" packet (e.g., an acknowledgement packet) are the same node;

d) a CMD byte which specifies the command to be executed by the destination node(s) which receives the packet;

e) a CMD_DATA byte which contains specific data to be used by the destination node(s) in executing the command specified by the CMD byte; and, f) a CHKSUM byte which indicates the sum of all logical "1" bits contained in the packet. This byte is used by the nodes to check whether the data contained in the packet is valid or not.

As previously discussed herein, the logical PaST address contained in the Log. Add. field of each data packet contains all of the information required to route the packet to its designated destination node. With reference now to FIG. 2, there can be seen a diagrammatical representation of a selected portion of a wireless, multihop network 20 which employs the PaST routing algorithm, which depicts the logical address structure of a single branch of the Partitioned Spanning Tree (PaST) which is used in deriving the logical PaST addresses of the individual nodes 22 in the network 20, and which also depicts an exemplary data communication path through a chain of repeater nodes (represented by the darkened circles) specified by the logical PaST address assigned to the destination node.

As is described in much greater detail in the above-referenced U.S. patent application Ser. No. 08/558,447, a logical Partitioned Spanning Tree (PaST) for the entire network is constructed by the control node 24 (e.g., the building computer BC) on the basis of nodal connectivity information gathered during a network initialization procedure, and a unique logical PaST address is assigned to each of the individual network nodes 22 in the network 20. A particularly effective method for initializing a wireless, packet-hopping network which optimizes the completeness and accuracy of the nodal connectivity information is disclosed in co-pending U.S. patent application Ser. No. 08/579,650, filed Dec. 27, 1995, in the name of the present inventor, George A. Melnik, and assigned to the assignee of the present invention, the disclosure of which is herein incorporated by reference.

The logical PaST address assigned by the building computer BC to each individual node 22 uniquely defines a single set or chain of repeaters or "hop chain" (represented by darkened circles in FIG. 2) that are to be used in communicating packets back and forth between the building computer BC and the node 22, and thus, the single, predetermined communication path (route) that a packet must travel to be communicated between the building computer BC and the individual node 22. The large circles shown in FIG. 2 represent a group or set of nodes 22 for which the respective repeater nodes are designated to serve as a repeater (i.e., to route packets to). The number above each of the large circles represents the logical PaST address of the corresponding repeater node contained therein. In general, the logical PaST addresses are formulated and assigned by determining an "optimum" communication path (i.e., specific, single "chain" of repeater nodes) between the building computer and each node, and then using a prescribed bit assignment technique which uniquely identifies each repeater node in the chain.

For example, in the exemplary case described in the above-referenced U.S. patent application Ser. No. 08/558,447, the repeater node directly linked to the building computer BC (i.e., the "first" repeater node in the chain) is assigned a one-segment logical PaST address which includes a sufficient number of bits to uniquely identify it as a "parent" node with respect to each of the "child" nodes for which it is designated to serve as a repeater (i.e., those contained within its large circle). In the specific example illustrated in FIG. 2, the logical PaST address assigned to the first repeater node in the depicted chain is "0100" ($40 in hexadecimal notation; byte-format, using zero-padding).

The second repeater node in the chain, which is one hop away from the building computer BC and which is a "child" node of the first repeater node in the chain, is assigned a two-segment logical PaST address which includes a first segment which comprises the address of its parent node (i.e., the first repeater node in the chain), and a second segment which includes a sufficient number of bits to uniquely identify it amongst its siblings (i.e., the other "children" nodes of the first repeater node (its parent node) in the chain). In the example, illustrated in FIG. 2, the logical PaST address assigned to the second repeater node in the depicted chain is "0100/011" ($46).

The third repeater node in the chain, which is two hops away from the building computer BC and which is a "child" node of the second repeater node in the chain, is assigned a three-segment logical PaST address which includes first and second segments which comprise the address of its parent node (i.e., the second repeater node in the chain), and a third segment which includes a sufficient number of bits to uniquely identify it amongst its siblings (i.e., the other "children" nodes of the second repeater node (its parent node) in the chain). In the example illustrated in FIG. 2, the logical PaST address assigned to the third repeater node in the depicted chain is "0100/011/11"($4780).

The destination node illustrated in FIG. 2, which is the leaf at the end of the depicted branch, and which is three hops away from the building computer BC, is assigned a four-segment logical PaST address which includes first, second, and third segments which comprise the address of its parent node (i.e., the third repeater node in the chain), and a fourth segment which includes a sufficient number of bits to uniquely identify it amongst its siblings (i.e., the other "children" nodes of the third repeater node (its parent node) in the chain). In the example, illustrated in FIG. 2, the logical PaST address assigned to the destination node in the depicted chain is "0100/011/11/011" ($47B0).

This logical PaST address bit assignment procedure continues until a leaf has been reached for each branch in the tree (the building computer BC being the root of the tree), with the number of address segments assigned to each node being equal to the tier/level number of that node (the first tier/level being those nodes which are directly linked to the BC, the second tier/level being those nodes that are one hop away from the BC, etc., so that he tier/level number of a node is one less than the number of hops (NH) required to reach that node (i.e., NH−1)). In general, the last segment of the logical PaST address assigned to each node consists of the n bits required to uniquely identify it relative to its siblings (i.e., the other nodes that share the same parent node), and thus, are conveniently referred to as the most significant bits of the logical PaST address. Further, the last two segments of the logical PaST address assigned to each node not in direct communication with the building computer BC consist of the n most significant bits of the logical PaST address of its parent node concatentated with its own n most significant bits, and are conveniently referred to as the k most significant bits of the logical PaST address.

As will be readily appreciated, the actual number n of most signficant bits for each node can be different, and, in general, only a number m of bits necessary to uniquely identify the node relative to its siblings is utilized, in order to thereby minimize the overall bit length of the logical PaST address. In order to facilitate byte-wise transmissions of data packets using a standard RS-232 serial protocol, the logical PaST addresses inserted into the Logical Address field of the data packets are preferably padded with sufficient zeroes to equalize the bit-lengths thereof. Further, as will also be readily appreciated, FIG. 2 only illustrates a single branch of the overall tree for the entire network 20. Of course, every node 22 represented by an open circle may also be designated to serve as a repeater for its own set of nodes.

In order to communicate data packets having the logical structure shown in FIG. 1 over the wireless network using the PaST routing algorithm depicted in FIG. 2, it is only necessary for each of the nodes 22 which receives a packet to make a bit-wise comparison of its logical PaST address (which is stored in its memory, e.g., EEPROM or other type of nonvolatile memory) with the logical PaST address contained in the Logical Address field of the received packet in order to determine whether it is either the designated destination node for the received packet or a designated repeater node for the received packet. In this connection, if an all-bits match is detected, then the node is the destination node, and thus, the node processes the packet and executed the command contained in the CMD byte of the received packet. If an all-bits match is not detected, then the k most significant bits of the node's own logical PaST address (i.e., the last two address segments) are compared with the logical PaST address contained in the received packet, and if a k-bits match is detected, then the received packet is repeated by the node, since it is definitely one of the repeaters in the repeater chain for the destination node which is defined by the logical PaST address contained in the received packet. If a k-bits match is not detected, the received packet is discarded.

The PaST routing protocol disclosed in the above-reference U.S. patent application Ser. No. 08/558,447 includes a mechanism for detecting a faulty link in the hop chain specified by the logical PaST address which is included in the Logical Address field of a data packet which is unsuccessfully transmitted, i.e., no acknowledgement packet is received by the sending node. For example, if the building computer BC transmits a query packet to a particular node and does not receive an acknowledgement packet back from that particular node within a prescribed time, then the building computer BC can (either immediately or after a prescribed number of further unsuccessful attempts) search for the faulty link(s) in accordance with any suitable fault detection scheme.

One such suitable fault detection scheme which is disclosed in the above-referenced U.S. patent application Ser. No. 08/558,447 is one in which the building computer BC sequentially sends an ECHO packet (using the PaST protocol) to each node in the hop chain specified in the packet which was unsuccessfully transmitted, and awaits for a copy of the ECHO packet to be sent back to it by each node in the hop chain which receives it. Failure to receive a response from a node indicates that the non-responding node is the faulty node in the hop chain. Another suitable fault detection scheme which is disclosed in the above-referenced U.S. patent application Ser. No. 08/558,447 is an implicit hop-by-hop acknowledgement (IHBH) scheme.

In either case, once the faulty node is identified, the network must be reconfigured in order to re-route packets around the faulty node. This is accomplished by reconfiguring the spanning tree to connect the spanning subtree rooted at the identified faulty node to a different part of the network such that the new parent of the subtree is within hearing range of all of the new children nodes. This reconfiguration of the network is accomplished by performing the requisite spanning tree and address assignment operations in the manner described previously. In this connection, the building computer BC may have to break up parts of the subtree to ensure that all nodes in the subtree are reconnected to other parts of the spanning tree. In fact, in some instances, a complete re-initialization of the entire network may be required. Another resident routing algorithm, such as FHC (Forward with Hop Count), could be utilized in order to directly reprogram the logical PaST addresses of each node which lies beyond the identified faulty node in the hop chain. In either case, the procedure required to eliminate the faulty node is excessively difficult and time-consuming and thus impractical for many applications.

The network configuration and routing scheme of the present invention have been devised to enable packets which have been unsuccessfully transmitted to be simply and rapidly re-routed around identified faulty nodes. In this connection, with the network configuration and routing scheme of the present invention, once a faulty node has been detected, all that is required is that the logical address inserted into the Logical Address field of the unsuccessfully transmitted packet be changed to a new logical address which defines (prescribes) a new communication path/route/hop chain which does not include the detected faulty node. Thus, since no re-programming or reconfiguration of the network is required to re-route the unsuccessfully transmitted packet around the faulty node, the delays which would otherwise be occasioned thereby are avoided.

Figures 3, 4:
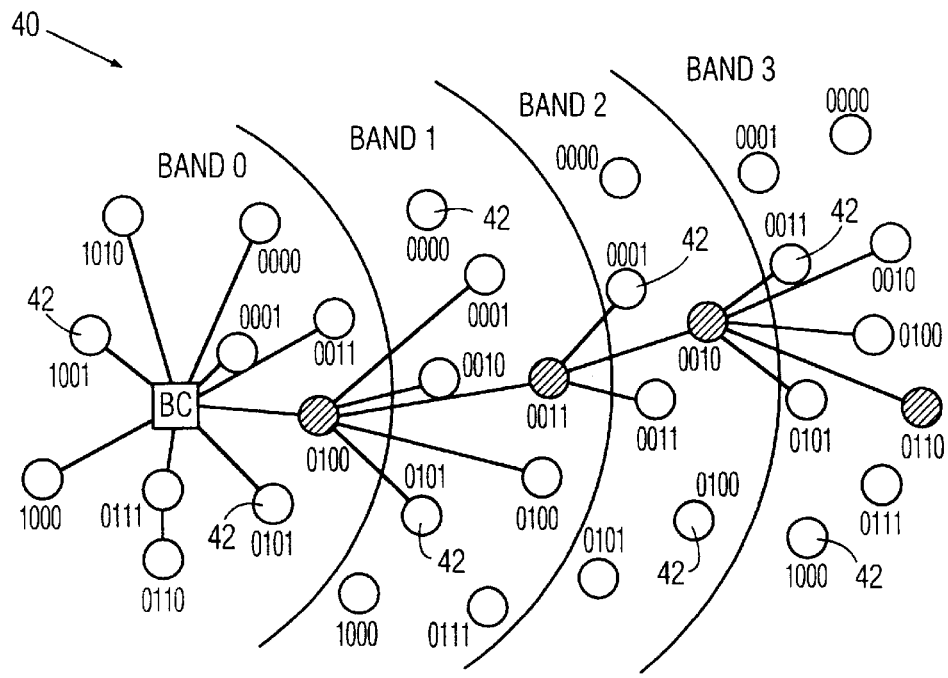
FIG. 3 is a diagrammatical representation of a selected portion of a wireless, multihop network which employs the routing algorithm of a presently preferred embodiment of the present invention, which depicts (in addition to one branch of the PaST "tree structure") the logical organization of the network into bands of nodes, and which further depicts an exemplary data communication path through a chain of repeater nodes in accordance with the originally assigned logical address of the destination node; and, FIG. 4 depicts the logical data structure of an exemplary data packet which can be used in a wireless, multihop network which employs the routing algorithm of the present invention.

More particularly, with reference now to FIG. 3, there can be seen a diagrammatical representation of a selected portion of a wireless, multihop network 40 which employs the routing algorithm of a presently preferred embodiment of the present invention, which depicts (in addition to one branch of the PaST tree structure) the logical organization of the network 40 into bands (Band 0–Band 3) of nodes 42, and which further depicts an exemplary data communication path through a chain of repeater nodes (darkened circles) in accordance with the originally assigned logical address of the destination node, which is the leaf at the end of the depicted branch of the PaST tree structure.

In accordance with the present invention, after the nodal connectivity information is gathered during a network initialization procedure, the network 40 is configured by logically organizing the network 40 into bands (Band 0–Band 3) of nodes 42, with the nodes 42 in each successive band Bi+1 being one hop further away from the building computer BC than are the nodes 42 in the previous band Bi, where i=0–m, and m represents the number of hops away which the nodes 42 in the outermost band Bm are from the building computer BC.

In this connection, each of the nodes 42 in a particular band Bi is a number i of hops away from the building computer BC. For the example illustrated in FIG. 3, all of the nodes 42 located in Band 0 are directly linked to the building computer BC, and thus, are zero (0) hops away from the building computer BC; all of the nodes 42 located in Band 1 are one hop away from the building computer BC; all of the nodes 42 located in Band 2 are two hops away from the building computer BC; and, all of the nodes 42 located in Band 3 are three hops away from the building computer BC.

Each of the bands Bi may be considered to constitute a different level or tier within a hierarchical logical network structure. Preferably, a node which is on the margin or fringe of a particular band (e.g., the node exhibits intermittent connectivity to the building computer BC) is included in the latter band (i.e., the band which is one hop away from the building computer BC), in order to minimize the probability of a faulty link rooted at that node.

In accordance with the present invention, after the nodes 42 are logically organized into successive bands Bi, each of the nodes 42 in the network 40 is assigned a logical address which includes a first address segment which identifies its band number, and a second address segment which identifies it relative to other nodes 42 in the same band. Preferably, the number of bits used in the second address segment is sufficient to uniquely identify each node 42 in the same band.

For example, if each band Bi contains a maximum of 16 nodes, then only 4 bits are required for the second address segment in order to uniquely identify each of the nodes 42 in each band Bi. Further, the band number assigned to each node 42, is preferably the number i of hops which the band Bi in which it is located is away from the building computer. Thus, for the example illustrated in FIG. 3, the first address segment of the logical address assigned to each of the nodes 42 will consist of 2 bits which uniquely identify the number of the band in which it is located.

For the sake of convenience, the logical address assigned to each of the nodes 42 will be referred to hereinafter as "bi/xxxx", e.g., the logical address of the node 42 having a band number b0 (i.e., which is located in Band 0) and having a band address segment "0100" will be referred to as "b0/0100". The logical addresses assigned to each of the nodes 42 are preferably stored in the memory thereof, e.g., in EEPROM or other type of non-volatile memory incorporated into the nodes 42. The logical addresses assigned to the nodes 42 during configuration of the network 40 in accordance with the present invention will be referred to hereinafter, for the sake of convenience, as "R-PaST" logical addresses, since the routing algorithm of the present invention will be referred to as a "R-PaST" routing algorithm.

As will become fully apparent hereinafter, the routing algorithm is referred to as the "R-PaST" routing algorithm in order to indicate that data packets can be routed through the network 40 by means of the nodes 42 simply comparing their logical address with the logical address contained in the data packets received thereby, as with the PaST routing algorithm, and further, to indicate that, unlike with the PaST routing algorithm, the network can be simply and rapidly dynamically "reconfigured" (R-) in response to detection of a faulty link in order to thereby re-route an unsuccessfully transmitted packet around the faulty node at the root of the faulty link, by simply changing the logical address contained in the Logical Address field of the packet.

With reference now to FIG. 4, there can be seen the logical data structure of an exemplary data packet which can be used in a wireless, multihop network which employs the routing algorithm of the present invention. The illustrated data packet includes the same data fields as does the previously described data packet depicted in FIG. 1, with the exception that the Add. Lng. field has been replaced with a "HOP Info." field.

In accordance with the presently preferred embodiment of the present invention, the HOP Info. byte includes a first segment (first half-byte) which identifies the number of hops required to send the packet to the destination node, and a second segment (second half-byte) which identifies the band number i of the band Bi in which the node 42 which has received the packet is located.

Further, the logical address inserted in to the Log. Add. field is preferably a concatenation of the band address segments of the R-PaST logical addresses of the respective repeaters which define the hop chain which constitutes the predetermined communication path between the sending and the destination node, plus the band address segment of the R-PaST logical address assigned to the destination node for "downstream" data communicatons, or the band address segment of the R-PaST logical address assigned to the sending node for "upstream" data communications.

For example, if three hops are required to transfer a packet from a sending node to a destination node, then the logical address inserted into the Log. Add. field of the packet will consist of three successive address segments corresponding to the band address segments of the R-PaST logical addresses of the respective repeaters in the designated hop chain between the sending node and the destination node, plus a fourth address segment which corresponds to the band address segment of the R-PaST logical address assigned to the destination node for "downstream" data communications, or the band address segment of the R-PaST logical address assigned to the sending node for "upstream" data communications.

In operation, the R-PaST routing algorithm of the present invention works in the following manner. More particularly, when a packet initially transmitted by the building computer BC, the second half-byte of the HOP Info. byte thereof will have a value of "0". All nodes which receive the packet are programmed to compare their band number i (i.e., the first portion of their R-PaST logical address) with the band number i indicated by the second half-byte of the HOP Info. byte of the packet, and, if a match is detected, to further compare the i+1th address segment of the logical address contained in the Log. Add. field of the packet with the band address segment of their R-PaST logical address.

All nodes which detect an address match are further programmed to, depending upon the direction in which the packet must travel to reach the destination node (i.e. "upstream" or "downstream"), as indicated by the status of a prescribed direction bit in the FLAG byte of the packet, either increment (for "downstream" communications) or decrement (for "upstream" communications) the second half-byte of the HOP Info. byte contained in the packet. In this fashion, each repeater node in the hop chain specified by the logical address contained in the Log. Add. field of the packet will appropriately increment or decrement the second half-byte of the HOP Info. byte of the packet upon receipt thereof.

For the example illustrated in FIG. 3, the packet as illustrated in FIG. 4 can be transmitted from the building computer BC to the destination node b3/0110 at the leaf of the depicted branch in the following manner, in accordance with the R-PaST routing algorithm of the present invention.

First, the designated repeater node b0/0100 in Band 0 which receives the packet will detect an address match between the band address segment of its R-PaST logical address and the first address segment ($4) of the logical address ($4325) contained in the Log. Add. field of the packet, and increment the HOP Info. byte of the packet from $30 to $31 before retransmitting the packet.

Next, the designated repeater node b1/0011 in Band 1 which receives the packet retransmitted by the designated repeater node b0/0100 in Band 0 will detect an address match between the band address segment of its R-PaST logical address and the second address segment ($3) of the logical address ($4325) contained in the Log. Add. field of the packet, and increment the HOP Info. byte of the packet from $31 to $32 before retransmitting the packet.

Next, the designated repeater node b2/0010 in Band 2 which receives the packet retransmitted by the designated repeater node b1/0011 in Band 1 will detect an address match between the band address segment of its R-PaST logical address and the third address segment ($2) of the logical address ($4325) contained in the Log. Add. field of the packet, and increment the HOP Info. byte of the packet from $32 to $33 before retransmitting the packet.

Finally, the destination node b3/0110 in Band 3 which receives the packet retransmitted by the designated repeater node b2/0010 in Band 2 will detect an address match the band address segment of its R-PaST logical address and the fourth address segment ($5) of the logical address ($4325) contained in the Log. Add. field of the packet. Since the hop count in the second half-byte of the HOP Info. byte is now equal to the total number of hops indicated by the first half-byte of the HOP Info. byte, the destination node b3/0110 will process the packet, and execute the command contained in the CMD byte of the packet. The packet as received by the destination node is depicted in FIG. 4.

As will be readily evident from the above and foregoing, the R-PaST routing method of the present invention provides a single predetermined communication path between the building computer and each node in the network via a specific set or chain or repeater nodes (or, "hop chain") designated by the logical address which is inserted into the Logical Address field of each packet transmitted between the building computer and any given node in the network. Of course, in the event the destination node has a direct RF link with the building computer (i.e., resides in Band 0), no repeater nodes are required for exchange of data packets therebetween. This aspect of the functionality of the R-PaST routing method is therefore like that of the original PaST routing method disclosed in the above-referenced U.S. patent application Ser. No. 08/558,447. However, the R-PaST routing method of the present invention provides enhanced functionality with respect to the original PaST routing method as described below.

More particularly, in accordance with the R-PaST network configuration and routing method of the present invention, when a faulty link is detected in response to an unsuccessful transmission of a data packet from the building computer to a destination node (or vice versa), the data packet can be easily and rapidly re-routed around the faulty node which is responsible for the faulty link by simply changing the logical address inserted into the Logical Address field of the unsuccessfully transmitted packet to a new logical address which defines a new communication path (i.e., hop chain) which circumvents the faulty node at the root of the faulty link. Thus, since no re-programming or reconfiguration of the network is required, the delays which would otherwise be occasioned thereby are avoided.

For example, with the illustrative network 40 depicted in FIG. 3, if the link from node b0/0100 to node b1/0011 is detected to be faulty in response to an unsuccessful communication of a packet from the building computer BC to the destination node b3/0110, a further communication can be attempted by substituting the node b0/0011 for the node b0/0100 by simply changing the logical address of the packet from $4325 to $3325, thereby re-routing the packet around the identified faulty node b0/0100.

Further more, an entirely different route (communication path/hop chain) can be utilized to transfer the packet to the same destination node b3/0110, e.g., by simply changing the logical address of the packet from $4325 to $5745.

Moreover, a capability of selecting new routes which incorporate lateral movement within a band could be obtained by means of assigning alternate addresses or band assignments to one or more nodes in the network prior to re-routing a previously unsuccessfully transmitted packet, or by establishing sufficiently thin bands during the intitial network initialization and configuration process.

An additional advantage of sufficiently thin bands is that all nodes within a common band can be made to have unique band address segments, thus eliminating the possibility that two nodes within the common band will handle the same packet. This, of course, is not a requirement. If the repeater node in the previous band is selected such that only the intended node of this band can receive the packet or the nodes with the same band address segment in the same band are located sufficiently far apart that this also can never occur.

The hop chain defined by the logical address of the packet will still remain the only possible communication path between the sending node and a given destination node, unless 2 or more nodes which reside in the same band and have the same address are within the transmitting range of the designated repeater node in the previous band (i.e., the band one hop closer to the sending node). This situation would only arise through improper communication path selection or via the use of RF transceivers which are sufficiently powerful to result in extensive node-to-node connectivity throughout the building. If the latter is the case, the use of wider bands (e.g., requiring 5–6 bit band address segments), resulting in fewer hops, would be warranted.

Based on the above and foregoing, it will now be appreciated by those skilled in the pertinent art that in the harsh fading environment of indoor RF communications networks, the functionality of simple and rapid network reconfiguration and adaptability is important to ensure an acceptable level of properly acknowledged data transfers (i.e., to ensure an acceptable level of data throughput). The R-PaST network configuration and routing method of the present invention, achieves this important functionality, by providing the ability to immediately attempt alternate routing of unsuccessfully transmitted packets without any network downtime.

As with the original PaST network configuration and routing protocol, the R-PaST network configuration and routing protocol of the present invention enables the utilization of resource-starved network nodes, and maintains a singular communication path, which facilitates the fastest possible data transfers and acknowledgements.

In sum, all of the benefits and advantages of the original PaST network configuration and routing protocol are maintained, while improving the overall capability and enhancing the overall functionality of the wireless network.

Although the present invention has been described in detail hereinabove, it should be clearly understood that many variations and/or modifications of the basic inventive concepts taught herein which may appear to those skilled in the pertinent art will still fall within the spirit and scope of the present invention as defined in the appended claims.

What is claimed is:

1. A method for configuring a wireless network comprised of a control node and a multiplicity of individual nodes, comprising the steps of:

logically organizing the network into a plurality of bands Bi, wherein each of the bands Bi includes a plurality of the individual nodes and is located a number i of hops away from the control node, where i=0 through N, and N≧1;

assigning a logical address to each of the individual nodes, and storing the assigned logical addresses in the respective individual nodes; and, wherein the assigned logical address for each individual node includes a first address portion which indicates the band Bi in which that individual node is located, and a second address portion that identifies that node relative to all other individual nodes located in the same band;

wherein the network comprises a packet-hopping wireless network in which data is communicated by transferring data packets from node-to-node:

wherein each of the individual nodes is programmed to perform the step of comparing its own logical address to a routing logical address contained in each packet which it receives, and to either discard, re-transmit, or process the packet based upon the results of the comparison;

wherein the routing logical address contained in a received packet contains the full routing information required to route the packet from a sending node to a destination node along a communication path prescribed by the routing logical address; and, wherein each received packet includes:

a direction bit which indicates the direction which the received packet must travel to reach the destination node;

a first set of bits which includes a hops value which indicates a number N of hops required to transfer the received packet from the sending node to the destination node, and a number of hops count;

a second set of bits which includes the routing logical address; and, a third set of bits which includes processing instructions for the destination node.

2. The method as set forth in claim 1, further comprising the step of initializing the network in order to obtain nodal connectivity information.

3. The method as set forth in claim 2, wherein the step of logically organizing the network is performed by the control node on the basis of the nodal connectivity information obtained during the step of initializing the network.

4. The method as set forth in claim 1, wherein all data communications are carried out over a common RF channel.

5. The method as set forth in claim 1, wherein each of the individual nodes is programmed to perform the steps of:
incrementing the number of hops count if the received data packet is to be re-transmitted by that node and if the direction is a first direction; and,
decrementing the number of hops count if the received data packet is to be re-transmitted by that node and if the direction is a second direction.

6. The method as set forth in claim 5, wherein:
the first direction is a downstream direction between the control node and the destination node; and,
the second direction is an upstream direction between the destination node and the control node.

7. The method as set forth in claim 5, wherein the step of comparing performed by each of the individual nodes includes a first sub-step of comparing the first address portion of its logical address with the number of hops count contained in the received packet, and either discarding the received packet or proceeding with further sub-steps of the step of comparing, depending upon the result of the first comparing sub-step.

8. The method as set forth in claim 7, wherein the further sub-steps of the step of comparing performed by each of the individual nodes include:
a second sub-step of comparing the second address potion of its logical address with a corresponding address portion of the routing logical address contained in the received packet, and proceeding with a next sub-step of the step of comparing if a match is detected; and,
a third sub-step of comparing the number of hops count with the hops value contained in the received packet, and either processing the received packet or re-transmitting the received packet, depending upon the result of the third sub-step of comparing.

9. The method as set forth in claim 8, wherein:
the routing logical address includes a number N+1 of address portions corresponding to respective bands between the sending node and the destination node; and,
the corresponding address portion of the routing logical address which is used in the second sub-step of comparing is the address portion which corresponds to the band Bi identified in the first address portion of the individual node which is performing the second sub-step of comparing.

10. The method as set forth in claim 1, wherein the wireless network comprises a building system control network, and the control node comprises a building computer.

11. The method as set forth in claim 10, wherein the building system control network comprises an intelligent lighting control system.

12. A method for configuring a wireless network comprised of a control node and a multiplicity of individual nodes, comprising the steps of:
logically organizing the network into a plurality of bands Bi, wherein each of the bands Bi includes a plurality of the individual nodes and is located a number i of hops away from the control node, where i=0 through N, and N>1:

assigning a logical address to each of the individual nodes, and storing the assigned logical addresses in the respective individual nodes; and, wherein the assigned logical address for each individual node includes a first address portion which indicates the band Bi in which that individual node is located, and a second address portion that identifies that node relative to all other individual nodes located in the same band;

wherein the network comprises a packet-hopping wireless network in which data is communicated by transferring data packets from node-to-node;

wherein each of the individual nodes is programmed to perform the step of comparing its own logical address to a routing logical address contained in each packet which it receives, and to either discard, re-transmit, or process the packet based upon the results of the comparison;

wherein the routing logical address contained in a received packet contains the full routing information required to route the packet from a sending node to a destination node along a communication path prescribed by the routing logical address; and, wherein the control node is programmed to control routing of packets by performing the steps of:
inserting the routing logical address into each packet which it transmits;
detecting any unsuccessfully transmitted packets;
detecting a faulty node in the communication path prescribed by the routing logical address in response to detecting an unsuccessfully transmitted packet; and,
changing the routing logical address of the unsuccessfully transmitted packet to a new routing logical address which prescribes a new communication path which does not include the detecting faulty node.

13. A wireless network, comprising:

a control node;

a multiplicity of individual nodes logically organized into a plurality of bands Bi, wherein each of the bands Bi includes a plurality of the individual nodes and is located a number i of hops away from the control node, where i=0 through N, and N$\geq$1; and, wherein each individual node has a logical address which includes a first address portion which indicates the band Bi in which that individual node is located, and a second address portion that identifies that node relative to all other individual nodes located in the same band;

wherein the network comprises a packet-hopping wireless network in which data is communicated by transferring data packets from node-to-node;

wherein each of the individual nodes is programmed to perform the step of comparing its own logical address to a routing logical address contained in each packet which it receives, and to either discard, re-transmit, or process the packet based upon the results of the comparison;

wherein the routing logical address contained in a received packet contains the full routing information required to route the packet from a sending node to a destination node along a communication path prescribed by the routing logical address; and, wherein each received packet includes;
    a direction bit which indicates the direction which the received packet must travel to reach the destination node;
    a first set of bits which includes a hops value which indicates a number N of hops required to transfer the received packet from the sending node to the destination node, and a number of hops count;
    a second set of bits which includes the routing logical address; and,
    a third set of bits which includes processing instructions for the destination node.

14. The network as set forth in claim 13, wherein control node is programmed to execute a network initialization procedure and to logically organize the network on the basis of nodal connectivity information obtained during the network initialization procedure.

15. The network as set forth in claim 13, wherein each of the individual nodes is programmed to increment the number of hops count if the received data packet is to be re-transmitted by that node and if the direction is a first direction, and to decrement the number of hops count if the received data packet is to be re-transmitted by that node and if the direction is a second direction.

16. The network as set forth claim 15, wherein:
    the first direction is a downstream direction between the control node and the destination node; and,
    the second direction is an upstream direction between the destination node and the control node.

17. The network as set forth in claim 15, wherein the routing logical address includes a number N+1 of address portions corresponding to respective bands between the sending node and the destination node.

18. The network as set forth in claim 15, wherein the control node is programmed to control the routing of packets by:
    inserting the routing logical address into each packet which it transmits;
    detecting any unsuccessfully transmitted packets;
    detecting a faulty node in the communication path prescribed by the routing logical address in response to detecting an unsuccessfully transmitted packet; and,
    changing the routing logical address of the unsuccessfully transmitted packet to a new routing logical address which prescribes a new communication path which does not include the detected faulty node.

19. The network as set forth in claim 18, wherein the network comprises a building system control network, and the control node comprises a building computer.

20. The network as set forth in claim 19, wherein the building system control network comprises an intelligent lighting control system.

21. A network node for use in a wireless network which includes a control node and a multiplicity of other network nodes, wherein all of the network nodes are logically organized into a plurality of bands Bi, and each of the bands Bi includes a plurality of network nodes and is located a number i of hops away from the control node, where i=0 through N, and N≧1; wherein the network node comprises:
    a memory for storing a logical address of the network node; and,
    wherein the logical address includes a first address portion which indicates the band Bi in which the network node is located, and a second address portion that identifies the network node relative to all other network nodes located in the same band;
    wherein the network comprises a packet-hopping wireless network in which data is communicated by transferring data packets from node-to-node;
    wherein the network node is programmed to perform the step of comparing its own logical address to a routing logical address contained in each packet which it receives, and to either discard, re-transmit, or process the packet based upon the results of the comparison;
    wherein the routing logical address contained in a received packet contains the full routing information required to route the packet from a sending node to a destination node along a communication path prescribed by the routing logical address; and,
    wherein each received packet includes;
        a direction bit which indicates the direction which the received packet must travel to reach the destination node;
        a first set of bits which includes a hops value which indicates a number N of hops required to transfer the received packet from the sending node to the destination node, and a number of hops count;
        a second set of bits which includes the routing logical address; and,
        a third set of bits which includes processing instructions for the destination node.

22. The network node as set forth in claim 21, wherein the network node is programmed to increment the number of hops count if the received data packet is to be re-transmitted by that node and if the direction is a first direction, and to decrement the number of hops count if the received data packet is to be re-transmitted by that node and if the direction is a second direction.

23. The network node as set forth in claim 22, wherein:
    the first direction is a downstream direction between the control node and the destination node; and,
    the second direction is an upstream direction between the destination node and the control node.

24. The network node as set forth in claim 22, wherein the routing logical address includes a number N+1 of address portions corresponding to respective bands between the sending node and the destination node.

25. The network node as set forth in claim 22, wherein the control node is programmed to control the routing of packets by:
    inserting the routing logical address into each packet which it transmits;
    detecting any unscuccessfully transmitted packets;
    detecting a faulty node in the communication path prescribed by the routing logical address in response to detecting an unsuccessfully transmitted packet; and,
    changing the routing logical address of the unsuccessfully transmitted packet to a new routing logical address which prescribes a new communication path which does not include the detected faulty node.

26. The network node as set forth in claim 21, wherein the network comprises a building system control network, and the control node comprises a building computer.

27. The network node as set forth in claim 26, wherein the building system control network comprises an intelligent lighting control system.

\* \* \* \* \*